(12) United States Patent
O'Connolly et al.

(10) Patent No.: US 6,463,215 B1
(45) Date of Patent: Oct. 8, 2002

(54) SYSTEM FOR SEQUENTIAL TRIGGERING OF CAMERAS AND PICTURE TAKING EQUIPMENT EQUIPPED WITH SUCH A SYSTEM

(75) Inventors: Patrick O'Connolly, Gif sur Yvette; Michel Toineau, Versailles, both of (FR)

(73) Assignee: Aerospatiale Matra Missiles, Paris (FR)

( * ) Notice: Subject to any disclaimer, the term of this patent is extended or adjusted under 35 U.S.C. 154(b) by 0 days.

(21) Appl. No.: 09/689,829

(22) Filed: Oct. 13, 2000

(30) Foreign Application Priority Data

Oct. 20, 1999 (FR) .............................. 99 13076

(51) Int. Cl.$^7$ .............................................. G03B 17/00
(52) U.S. Cl. ...................................... 396/263; 396/265
(58) Field of Search .................................. 396/263, 265

(56) References Cited

U.S. PATENT DOCUMENTS

| | | | |
|---|---|---|---|
| 5,022,727 A | * | 6/1991 | Smith et al. ................. 396/325 |
| 5,264,882 A | | 11/1993 | Kameyama et al. |
| 5,477,291 A | | 12/1995 | Mikami et al. |
| 5,659,323 A | | 8/1997 | Taylor |
| 5,923,911 A | | 7/1999 | Uchiyama et al. |
| 6,052,539 A | * | 4/2000 | Latorre ........................ 396/263 |
| 6,157,409 A | * | 12/2000 | Riches ......................... 348/362 |

OTHER PUBLICATIONS

"Un Photographe Champion De Vitesse," p. 12, Unlimited Mars 1999, No. 13.
"Un Photographe Ultra–Rapide!," p. 50, Le Courrier Professional Cedite par Kodak, Avril 1990 No. 109.

* cited by examiner

Primary Examiner—David M. Gray
(74) Attorney, Agent, or Firm—Thelen Reid & Priest; Robert E. Krebs

(57) ABSTRACT

A sequential trigger system (10) for triggering a plurality of cameras (42, 42a) equipped with a burst picture taking mode is provided. The system includes a clock (12) and means (14, 16) of fixing the frequency of the clock frequency, and further includes means (20) of successively starting operation of the cameras in burst mode in response to a trigger signal, the means being controlled by the clock so as to put the cameras into operation at an operating rate faster than the rate at which the cameras take pictures in burst mode.

15 Claims, 3 Drawing Sheets

SYSTEM FOR SEQUENTIAL TRIGGERING OF CAMERAS AND PICTURE TAKING EQUIPMENT EQUIPPED WITH SUCH A SYSTEM

TECHNICAL FIELD

The present invention relates to a system for sequential triggering of cameras and picture taking equipment equipped with the said system.

Within the framework of the invention, a camera refers to a still camera for taking frame by frame type pictures, in opposition to movie cameras designed for "continuous" recording of pictures. For example, it may consist of a reflex camera or a compact 24×36 camera, or even optionally a digital camera.

The invention is used for applications in the photography of fast phenomena, particularly for applications related to ballistics, "crash test" type impact studies, movement analysis in sports events, or the study of the trajectory and dynamics of a projectile for example.

STATE OF PRIOR ART

Most modern cameras, and particularly reflex cameras, are provided with an operating mode called "burst" mode. In this operating mode, the camera continues to take successive views for as long as the trip device is activated. Successive views are recorded at the maximum rate possible for the camera. This is controlled mainly by the film advance device installed in the camera.

For example, burst operating mode may be used for the photography of sports events. It is capable of capturing several pictures per second, with a maximum of 6 to 8 pictures per second depending on which camera is used.

However, this rate is insufficient in some applications.

A higher picture taking rate is possible if a "continuous" recording camera is used, such as a movie camera or a video camera (camescope). Therefore, cameras are capable of collecting fast phenomena or events and enabling a better decomposition of these events in a sequence of instantaneous pictures.

However, the quality of pictures taken by "continuous" recording cameras is very much lower than the quality obtained using frame by frame type cameras and is often insufficient for a detailed analysis of a sequence of individual pictures.

Equipment is also known in which several cameras are installed in sets and are computer controlled in order to achieve a trigger rate faster than the burst mode rate of individual cameras. Further information about this subject is given in documents (1) and (2), the references of which are given at the end of this description.

There are several limitations or difficulties with equipment using a set of cameras.

A first difficulty is due to the need to transform or reconfigure the trigger system when the number of cameras used in the set is modified. Exactly the same problem occurs when cameras with a different picture taking rate in burst mode are used.

Another difficulty is due to the fact that in burst mode, cameras usually finish the number of pictures available on their film very quickly. Therefore, the film has to be changed for each new series of pictures taken. It may be difficult or even impossible to make this film change when taking pictures in a hostile environment. Replacing the film in all cameras is also an expensive operation in terms of time, and requires a relatively long interruption between successive series of pictures taken.

Another difficulty arises when triggering cameras. An operator has to be present and equipment must be installed close to the subject to be photographed. These constraints can cause difficulties when taking pictures in a hostile environment.

DESCRIPTION OF THE INVENTION

The purpose of the invention is to propose a sequential trigger system and picture taking equipment largely to avoid the difficulties mentioned above.

One purpose in particular is to propose a sequential trigger system that can be used with a variable number of cameras and for different rates of taking pictures in each camera.

Another purpose is to propose a system for recording several series of photographs without systematically replacing the films in the cameras.

Yet another purpose is to be able to control cameras from a location remote from the subject being photographed and to be able to servocontrol cameras to a specific event, for example such as firing.

More precisely, in order to achieve these purposes, the objective of the invention is a system for sequential triggering of several cameras equipped with a burst mode. The system comprises:

a clock and means of fixing a clock frequency for the said clock as a function of the number of cameras to be controlled by the system and/or as a function of the rate at which cameras can take pictures in burst mode, means of successively starting the operation of the cameras in burst mode in response to a trigger signal, the means being controlled by the clock so as to put the cameras into operation at an operating rate faster than the picture taking rate of the cameras in burst mode.

Since the operating rate is faster than the picture taking rate in burst mode, the cameras are triggered in turn so that a fast global picture taking rate can be achieved.

The clock frequency may be fixed and optimized such that the operating rate denoted Cs is equal to N×Cr, where Cr and N are respectively the rate at which the cameras take pictures in burst mode, and the number of cameras controlled by the system.

The operating rate is also equal to the global rate at which pictures are taken by the set of cameras controlled by the system.

For example, the camera operating rate and the global picture taking rate Cs is equal to 48 pictures per second, if six cameras are used with a rate Cr in burst mode equal to 8 pictures per second.

Means of fixing the clock frequency can be provided so that the structure of the trigger system can be instantaneously adapted for use with a variable number N of cameras and an arbitrary rate Cr at which the cameras used are triggered in burst mode, without changing the structure of the trigger system.

In this case it is assumed that all cameras used have practically the same trigger rate in burst mode.

The clock frequency is preferably fixed at a value that is a multiple of the product Cr.N, in other words a multiple value of the rate Cs mentioned above. Thus, cameras can be put into successive operation with better time precision.

According to one particular aspect of the invention, the trigger system may also comprise a timer to fix the total picture taking duration and to suspend operation of cameras when the total fixed duration has expired.

Events to be photographed with a high picture taking rate are typically transient events or fast events for which the global duration does not exceed a few seconds.

Thus, using the timer, the series of pictures being taken can be interrupted before the reel of film installed in each camera is finished, and a new series can be restarted again later.

For example, if the cameras used have a picture taking rate in burst mode equal to 8 pictures per second, and if the total picture taking time is fixed at 2 seconds, two series of pictures being taken (16 pictures per series) can be recorded on a standard film for 36 pictures.

If the time is fixed at less than the time necessary to complete the film, several series of pictures can be taken without reloading the cameras. This is an important advantage for taking pictures in a hostile environment, for example in studying projectiles, or for correcting a firing defect.

According to another aspect of the invention, the trigger system may include means of outputting a trigger signal and remote transmission means for transmitting the trigger signal to an input triggering the trigger system.

In their simplest embodiment, the means of supplying a trigger signal may comprise a single trigger switch that can be operated by an operator and designed to close an associated trigger circuit.

These means may also comprise a countdown device, for example similar to devices used for firing projectile engines.

Thanks to the remote transmission means of the trigger signal, the system can be used in an hostile environment in which the presence of humans is impossible. It can also be used so that heavy equipment can be installed in a location remote from the subject being photographed.

For example, the transmission means may include symmetric transmission lines, optical transmission lines or transmitters-receivers for transmission by radio.

When the system is intended for isolated and standalone operation, it may also be equipped with electrical power supply means such as a battery.

The invention also relates to picture taking equipment comprising several cameras each with a burst picture taking mode and a trigger system like that described above.

The picture taking equipment may comprise a single trigger system or several trigger systems each connected to several cameras. In this case, the trigger systems are controlled by a single clock and comprise means of controlling the operation of cameras using synchronized counters.

An increase in the number of trigger systems and in the total number of controlled cameras, is a means of further increasing the rate of taking pictures and/or increasing the number of positions from which pictures can actually be taken.

For example, the different trigger systems may be synchronized so as to trigger all cameras successively at different times. They can also be synchronized to simultaneously trigger several cameras each belonging to several sets of cameras located in different locations.

According to one particular embodiment, the trigger system for the picture taking equipment may also comprise remote transmission means to transmit operation control signals to the cameras associated with each signal.

These means make it possible to place the trigger system (s) and the controlled cameras at a large distance from each other.

For example, signal transmission means may comprise symmetric two-wire lines, optical transmission means and/or radio transmission means.

Other characteristics and advantages of the invention will become clear from the following description with reference to the figures in the attached drawings. This description is given for illustrative purposes only and is in no way restrictive.

DETAILED DESCRIPTION OF EMBODIMENTS OF THE INVENTION

Reference 10 denotes a trigger system corresponding to a particular embodiment of the invention, in a general manner.

The trigger system 10 comprises a clock 12 in the form of an oscillator, the frequency of which may be controlled by an RC (Resistance Capacitance) type circuit.

This is done by connecting the oscillator to a selector 14, to apply different values of resistance corresponding to different clock frequencies to a control input. For example, the frequency and the cyclic ratio of the clock signal are fixed by resistances 16, only one element of these resistances being shown.

Figure 1:
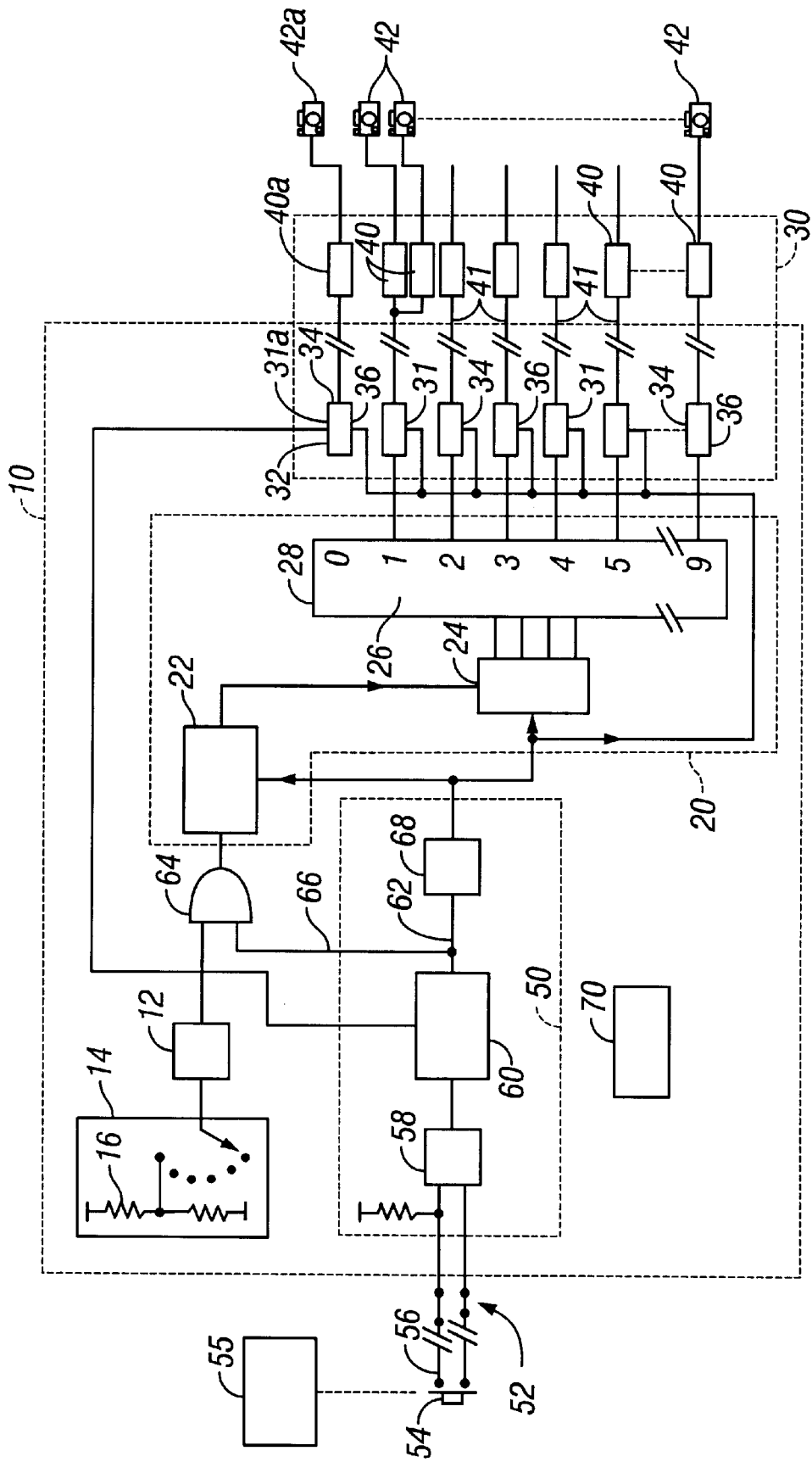
FIG. 1 is a simplified diagrammatic view of picture taking equipment according to the invention.

Frequencies may be controlled continuously, or they may be controlled by pre-selected discrete values as illustrated in FIG. 1. For example, the preselected values may correspond to different frequencies adapted to the control of a variable number of cameras and/or the control of cameras with different picture taking rates in burst mode.

The clock thus outputs pulses at a frequency that is a multiple of N×Cr, in other words a multiple of the product of the rate cr of the cameras in burst mode, and the number of controlled cameras N.

Clock pulses are output to a counting assembly 20. The counting assembly comprises one or several frequency dividers that adjust the clock frequency to the value N×Cr with good precision. In the example illustrated, a single frequency divider is shown and is marked as reference 22.

The counting assembly 20 also comprises a binary counter 24 and a binary/decimal converter 26.

The BCD (Binary Coded Decimal) binary counter 24 receives the divided clock signal and outputs a binary counting signal.

The binary counting signal is transmitted to converter 26. This converter comprises a number of outputs 28, for example 10 outputs, that output pulses in sequence one after the other in response to the counting signal. Pulses output by the converter follow each other at a rate imposed by the clock frequency (divided) applied to the binary counter 24.

An RS flip-flop 31 is connected to each output 28 of the converter 26. Each flip-flop 31 has an output 34 that can change from a said "inactive" logical state to a said "active" logical state, respectively in response to a pulse output by converter 26 to their signal input 32. The flip-flops 31 also have a reset input 36, the function of which will be described later.

For example, the active and inactive states may correspond to logical states 0 and 1.

The outputs 34 from flip-flops 31 are connected to control relays 40 through lines marked as reference 41. For example, the lines may be differential lines equipped with line transmitters and receivers (not shown).

When the distances between the flip-flops 31 and the relays 41 are small, a single wire line can also be used.

Relays with one or several contacts can be connected to the trigger terminals of one or several cameras 42. A relay controls a camera. The relays put the camera trigger terminals into contact with each other in response to an "active" logical state output by an associated flip-flop. The effect is to trigger the cameras 42 which are also set to operate in burst mode. The cameras 42 thus take pictures in sequence at their own burst rate Cr for as long as their trigger terminals are connected, in other words for as long as the flip-flop 31 associated with them outputs an active logical state.

All cameras connected to the same relay take pictures approximately simultaneously, to the extent that all cameras have approximately the same rate Cr in burst mode.

Cameras connected to different relays, in other words associated with different outputs 28 from converter 26 take pictures at time intervals inversely proportional to the clock frequency (divided). However, when taken individually, each camera takes a series of pictures, always at its own rate in burst mode Cr.

The result obtained for a set of N cameras associated with an equivalent number of outputs 28 from the converter 26 is a global rate of N×Cr, as mentioned above.

The assembly formed by RS flip-flops 31, lines 41 and relays, is marked with the general reference 30 and is referred to as the "control interface" in the remainder of the text. Furthermore the control interface 30, together with the counting assembly 20, form the means of putting the cameras into operation according to the meaning in this invention.

The trigger system 10 has a trigger input 52 that can be connected to means capable of forming a trigger signal.

In the example of FIG. 1, these means comprise a simple switch 54 capable of connecting two wires on a transmission line 56 to the same electrical potential. The signals can originate with a countdown device 55.

Other means of transmitting a trigger signal may be provided, depending on the distance between the switch 54 and the trigger input 52. Transmission by a radio channel would be possible if the distances are very large.

A first signal shaping circuit 58 connected to the input 52 is provided to form a logical trigger signal with an appropriate shape in response to switch 54 being closed.

This signal is transmitted to an adjustable timer circuit 60 with a logical output 62. This timer circuit performs two functions, of initiating and interrupting the pictures taken by all cameras.

The timer 60 outputs a logical "authorization" state (for example 1) that is applied to an AND gate 64, in response to a trigger signal. This signal authorizes the transmission of clock pulses from clock 12 to the counting assembly 20 and cause successive changeovers of the flip-flops 31 from the inactive state to the active state.

FIG. 1 shows that the timer also has a second logical output 66 directly connected to one of the RS flip-flops marked as reference 31a. The flip-flop 31a concerned is not connected to the counting assembly 20 like the other flip-flops, but is directly controlled by timer 60.

Thanks to this particular embodiment which is advantageous but is not essential, it is possible to perfectly synchronize triggering pictures taken by a first camera 42a with the trigger signal applied to input 52.

The flip-flop 31a controlled directly by the timer 60 is connected to the first camera 42a by means of a relay denoted as reference 40a. However, this relay is similar to the other relays 40 in the control interface 30 of which it also forms part.

The user can adjust the timer 60 to fix the picture taking period for all cameras.

This duration may be counted starting from the moment at which the trigger signal is received, or possibly starting from a later delayed instant.

When the timeout has elapsed, the timer outputs a logical "disable" state (for example 0) that is applied to the AND gate 64 and that disables transmission of pulses from clock 12 to the counting assembly 20.

Furthermore, the logical "disable" state is applied to the reset input 36 of the flip-flop assembly 31, 31a through a second signal shaping circuit 68. It is also applied to the divider 22 and the binary counter 24 to reinitialize them.

The signal shaping circuit 68 consists essentially of a mono-stable flip-flop capable of outputting a reset pulse in response to detection of a change in the state of the timer 60 from the logical "enable" state to the logical "disable" state.

In the remainder of the text, the assembly formed by the timer 60 and the shaping circuits 58, 68, is referred to as the "control circuit" and is marked with the general reference 50.

Reference 70 denotes standalone power supply means such as a battery connected to all electronic circuits in the trigger system 10.

Figure 2:
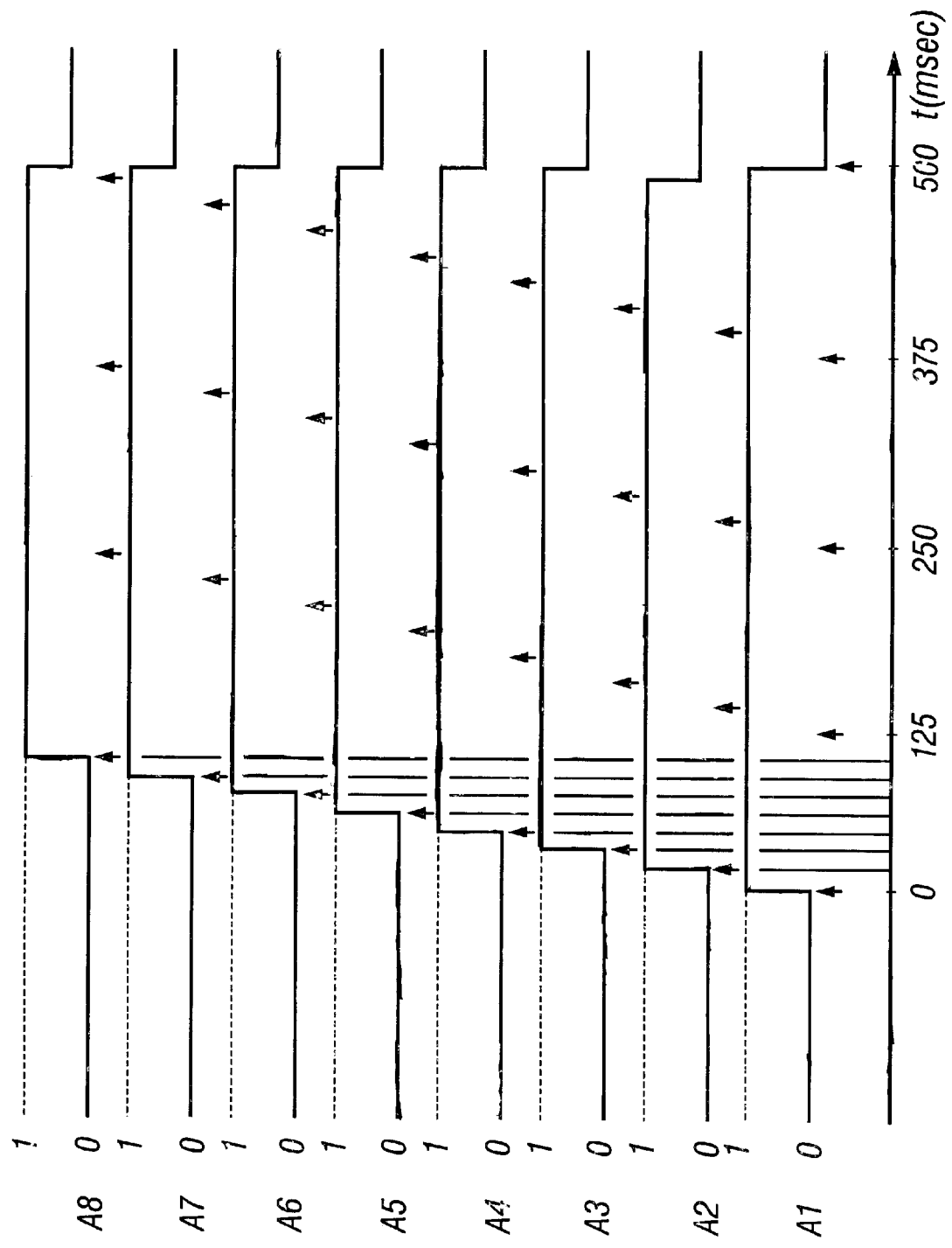
FIG. 2 is a time diagram showing trigger signals output by a trigger system for the equipment in FIG. 1.

FIG. 2 is a time diagram illustrating the logical state A1 to A8 of 8 flip-flops 31, 31a associated with 8 corresponding cameras capable of operating in burst mode. In the example illustrated, it is considered that the logical state 0 corresponds to a camera that is not operating and that state 1 corresponds to a camera that is taking pictures in burst mode. Furthermore in the example illustrated, for simplification purposes it is considered that each camera has its own individual picture taking speed of 8 pictures per second, in other words each camera takes one picture every 125 msec.

Instant 0 on the abscissas axis is the time at which the trigger signal is received. This instant also corresponds to when the first camera is put into operation for the first time.

The second camera is started after a duration corresponding to one eighth of the time between two successive frames, in other words about 15.6 msec.

Thus, the cameras are put into operation in sequence approximately every 15.6 msec until all cameras are in operation (in burst mode).

The small arrows indicate the times at which pictures are taken by each camera.

One camera is tripped approximately once every 15.6 msec, which corresponds to approximately 64 pictures per second.

Figure 3:
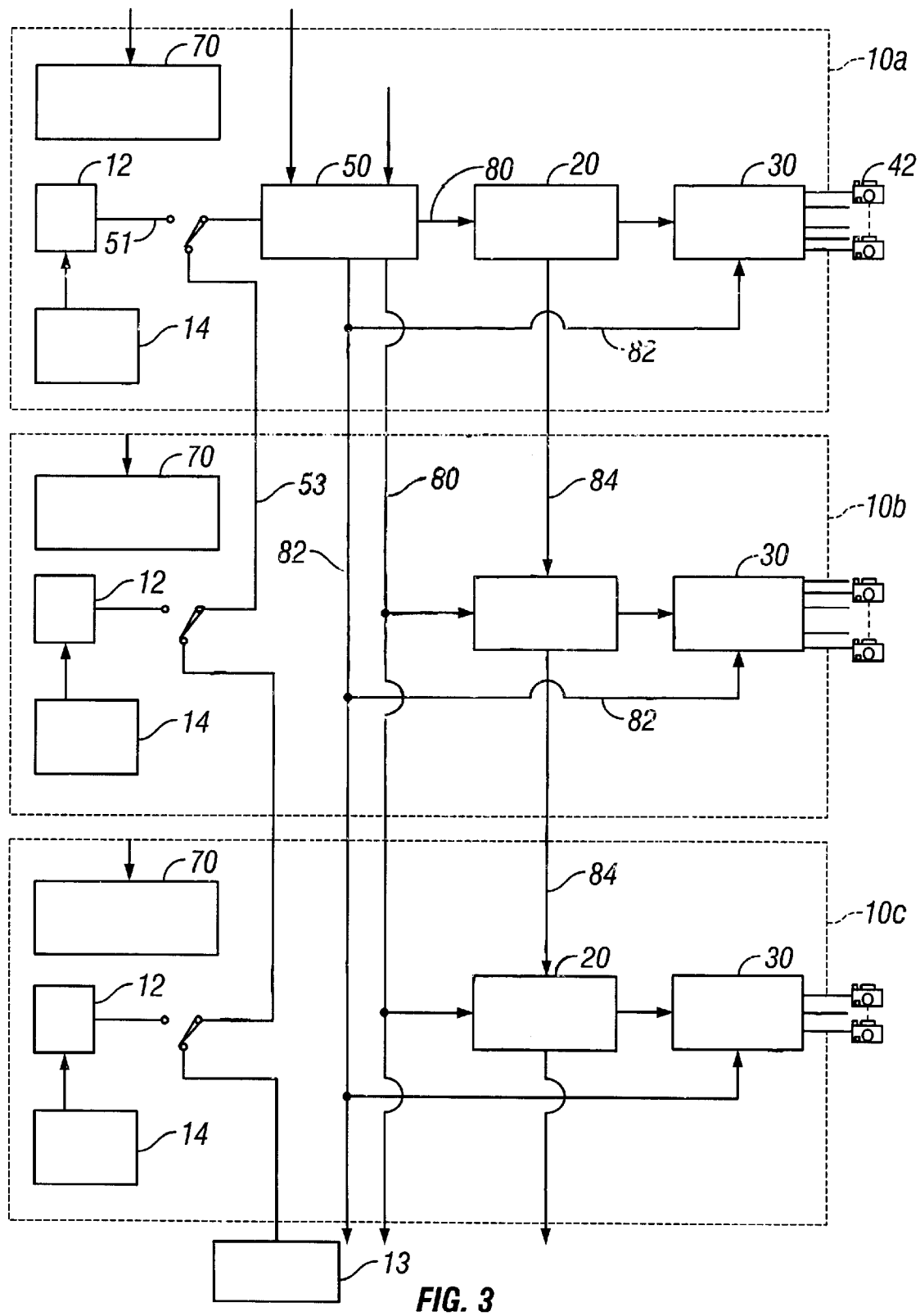
FIG. 3 is a simplified diagrammatic view of a picture taking equipment equipped with several trigger systems.

FIG. 3 shows picture taking equipment comprising three trigger systems 10, 10b, 10c, comparable to the system described with reference to FIG. 1.

Parts identical to or similar to those shown in FIG. 1 have the same references and they are not described again here.

One of the trigger systems 10a is used to control the other systems 10b, 10c. This system is referred to as the "master" system, in opposition to the other systems 10b, 10c that are referred to as "slave" systems.

The control circuit 50 for the master trigger system 10a is equipped with a switch 51 so that it can be connected either to the internal clock 12, or to an external clock 13, the pulses of which are received as a clock signal input.

In the example described here, each trigger system is associated with six cameras. These cameras may be controlled so that they are triggered successively one after the other or such that a camera is triggered simultaneously by each of the trigger systems.

Depending on the case, the clock frequency is adjusted to be equal to a multiple of Cr.N where N is the total number of cameras, or to correspond to a number Cr.n where n is the number of cameras associated with each trigger system.

The logical states to "enable" taking pictures are transmitted to each system counting assembly 20 through a control circuit 50 in the master trigger system 10a and through connections marked as reference 80. Similarly, reset signals are transmitted to all camera control interfaces 30 through connections marked as reference 82.

Finally, it can be seen that the counting assemblies 20 in slave systems are connected to each other and to the master system through lines 84, in order to synchronize their counters.

The number of trigger systems put in sequence according to the diagram in FIG. 3 may be increased by increasing the number of slave trigger systems.

DOCUMENTS MENTIONED (1)
Le Courrier Professionnel (Professional Correspondence) (KODAK), April 1990, No. 109, page 50.
(2)
UNLIMITED, Fujifilm magazine, March 1999, No. 13, page 12.

What is claimed is:

1. System for sequential triggering of a plurality of cameras each adapted to operate in a burst mode, comprising:
    a clock;
    means for fixing a clock frequency of said clock as a function of the number of cameras to be controlled by the system, as a function of the rate at which the cameras can take pictures in burst mode or as a function of both said number and said rate; and
    means for successively initiating the burst mode of the cameras in response to a trigger signal, the means for successively initiating being controlled by the clock so as to cause the plurality of cameras to take pictures at a combined rate which is faster than the rate at which the individual cameras take pictures in burst mode.

2. Trigger system according to claim 1, in which the clock frequency is fixed such that the operating rate, denoted Cs, is equal to N×Cr, where Cr and N are respectively the rate at which the cameras used take pictures in burst mode, and the number of cameras controlled by the system.

3. Trigger system according to claim 1, also comprising a timer to fix the total picture taking time and to suspend the operation of cameras when the total fixed duration has expired.

4. Trigger system according to claim 1, in which the means of controlling operation of the cameras include a counter connected to the clock through frequency dividers.

5. Trigger system according to claim 4, in which the counter comprises a BCD (Binary Coded Decimal) counter and a BCD-decimal converter.

6. Trigger system according to claim 1, comprising standalone electrical power supply means.

7. Trigger system according to claim 1, comprising a clock signal input and a switch to select a clock signal originating from the clock signal input or an internal clock.

8. A picture taking system comprising:
    a plurality of cameras each with a burst mode; and
    at least one sequential trigger system connected to the plurality of cameras, said trigger system:
        a clock;
        means for fixing a clock frequency of said clock as a function of the number of cameras to be controlled by the system, as a function of the rate at which the cameras can take pictures in burst mode or as a function of both said number and said rate; and
        means for successively initiating the burst mode of the cameras in response to a trigger signal, the means for successively initiating being controlled by the clock so as to cause the plurality of cameras to take pictures at a combined rate which is faster than the rate at which the individual cameras take pictures in burst mode.

9. A system according to claim 8, comprising means of outputting a trigger signal and means of remote transmission of the signal to an input of the trigger system.

10. A system according to claim 9, in which means of outputting a trigger signal comprising a switch are provided.

11. A system according to claim 10, in which means of providing a trigger signal comprise a countdown device.

12. A system according to claim 8, comprising a plurality of trigger systems each connected respectively to a plurality of cameras in which the trigger systems are connected to a single clock and comprise means of putting cameras with synchronized counters into operation.

13. A system according to claim 8, in which the trigger system comprises remote transmission means for transmitting start signals to the respectively corresponding cameras.

14. A system according to claim 12, in which the transmission means for transmitting start signals include one or more of transmission means using symmetric two-wire lines, optical transmission means, and radio transmission means.

15. A system according to claim 8, further comprising means of controlling operation of the trigger system, said means of controlling comprising a counter connected to the cameras through RS flip-flops.

* * * * *